United States Patent
Melati et al.

(10) Patent No.: US 12,449,598 B2
(45) Date of Patent: Oct. 21, 2025

(54) WAVEGUIDE ANTENNA DEVICE

(71) Applicants: NATIONAL RESEARCH COUNCIL OF CANADA, Ottawa (CA); CARLETON UNIVERSITY, Ottawa (CA)

(72) Inventors: Daniele Melati, Ottawa (CA); Dan-Xia Xu, Ottawa (CA); Pavel Cheben, Ottawa (CA); Jens H. Schmid, Ottawa (CA); Mohsen Kamandar-Dezfouli, Ottawa (CA); Yuri Grinberg, Ottawa (CA); Ross Cheriton, Ottawa (CA); Siegfried Janz, Ottawa (CA); Winnie N. Ye, Ottawa (CA); Shahrzad Khajavi, Ottawa (CA)

(73) Assignees: NATIONAL RESEARCH COUNCIL OF CANADA, Ottawa (CA); CARLETON UNIVERSITY, Ottawa (CA)

( * ) Notice: Subject to any disclaimer, the term of this patent is extended or adjusted under 35 U.S.C. 154(b) by 232 days.

(21) Appl. No.: 18/005,483

(22) PCT Filed: Jul. 14, 2021

(86) PCT No.: PCT/IB2021/056354
§ 371 (c)(1),
(2) Date: Jan. 13, 2023

(87) PCT Pub. No.: WO2022/013780
PCT Pub. Date: Jan. 20, 2022

(65) Prior Publication Data
US 2023/0258865 A1    Aug. 17, 2023

Related U.S. Application Data

(60) Provisional application No. 63/051,427, filed on Jul. 14, 2020.

(51) Int. Cl.
*G02B 6/124* (2006.01)
*G02B 6/34* (2006.01)

(52) U.S. Cl.
CPC ............... *G02B 6/124* (2013.01); *G02B 6/34* (2013.01)

(58) Field of Classification Search
CPC .................................. G02B 6/34; G02B 6/124
See application file for complete search history.

(56) References Cited

U.S. PATENT DOCUMENTS

| 8,503,839 B2 | 8/2013 | Cheben et al. |
| 2014/0241661 A1 | 8/2014 | Chen et al. |

(Continued)

FOREIGN PATENT DOCUMENTS

WO    WO-2019212414 A1    11/2019

OTHER PUBLICATIONS

Melati, Daniele, et al. "Design of compact and efficient silicon photonic micro antennas with perfectly vertical emission." IEEE Journal of Selected Topics in Quantum Electronics 27.1 (2021): 1-10.

(Continued)

*Primary Examiner* — Michael P Mooney
(74) *Attorney, Agent, or Firm* — PERRY + CURRIER INC.

(57) ABSTRACT

An antenna device for performing off-chip light coupling comprising an array of radiating elements whose thickness is larger than $\lambda/2$, the radiating elements being chosen such that the length of the array is smaller than $10\lambda$, where $\lambda$ is the wavelength of light in the material chosen for the radiating elements. An advantage of this method is that, unlike in conventional waveguide grating antenna, by reducing the number of the radiating elements in the array, the dependence of the off-chip emission angle on the wave- (Continued)

length of light can be greatly reduced. Another advantage is that by using thick radiating elements the antenna efficiency can be greatly enhanced, thereby compensating for the reduced efficiency occurring as a consequence of using only a small number of radiating elements in the array.

19 Claims, 10 Drawing Sheets

(56) References Cited

U.S. PATENT DOCUMENTS

2018/0052501 A1* 2/2018 Jones, Jr. ............. G02B 5/1857
2018/0231702 A1 8/2018 Lin et al.

OTHER PUBLICATIONS

Melati, Daniele, et al. "Efficient silicon photonic micro-antenna for waveguide-to-free-space coupling." Integrated Photonics Research, Silicon and Nanophotonics. Optica Publishing Group, 2020.
Benedikovic, Daniel, et al. "Sub-decibel silicon grating couplers based on L-shaped waveguides and engineered subwavelength metamaterials." Optics express 27.18 (2019): 26239-26250.
Passoni, M., et al. "Grating couplers in silicon-on-insulator: The role of photonic guided resonances on lineshape and bandwidth." Applied Physics Letters 110.4 (2017): 041107.
Sapra, Neil V., et al. "Inverse design and demonstration of broadband grating couplers." IEEE Journal of Selected Topics in Quantum Electronics 25.3 (2019): 1-7.
Wang, Yun, et al. "Design of broadband subwavelength grating couplers with low back reflection." Optics letters 40.20 (2015): 4647-4650.
Xiao, Zhe, et al. "Bandwidth analysis of waveguide grating coupler." Optics express 21.5 (2013): 5688-5700.

* cited by examiner

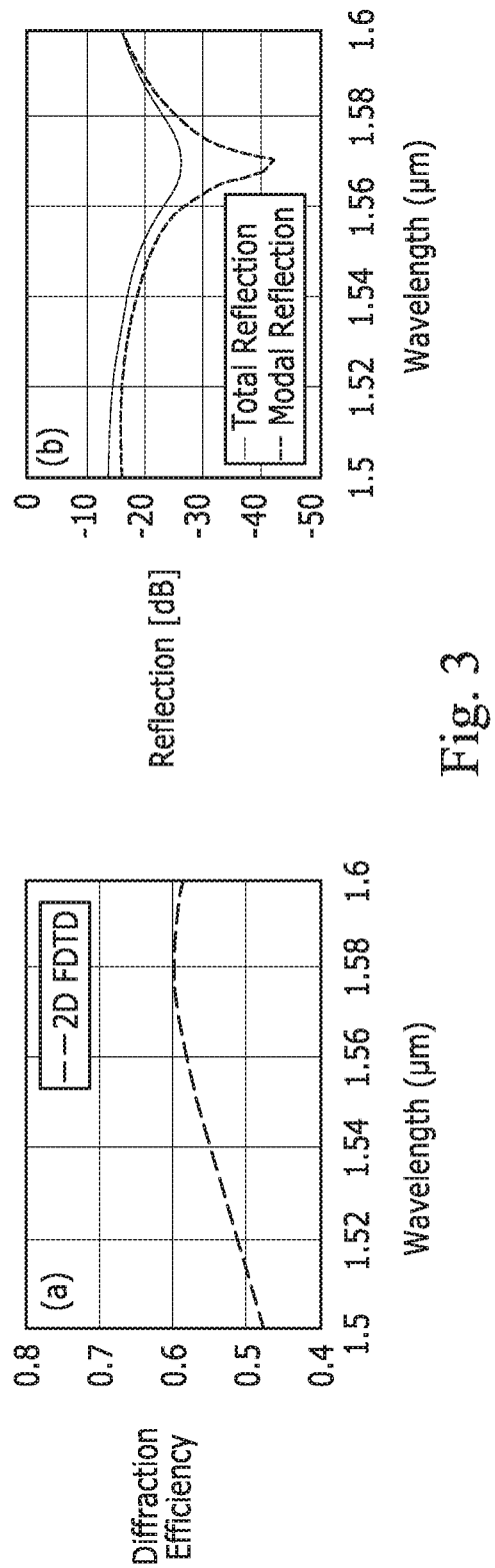
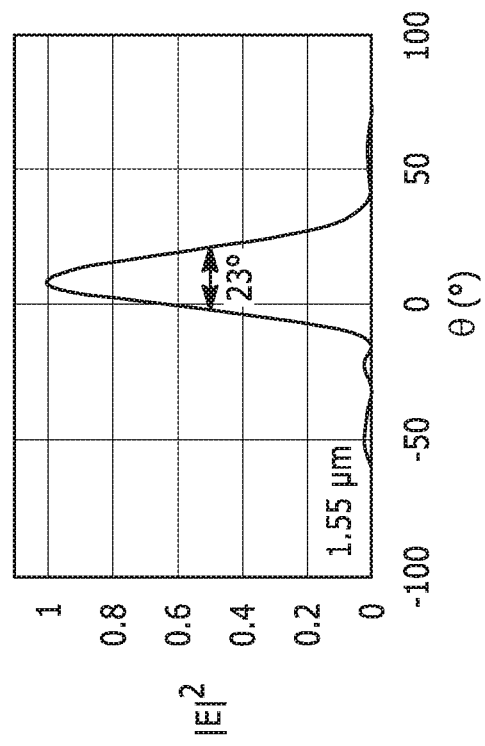
Fig. 3
Fig. 4

WAVEGUIDE ANTENNA DEVICE

FIELD OF THE INVENTION

The present disclosure generally relates to the field of optical waveguides. More particularly, examples of the disclosure relate to an antenna device for performing light emission from such waveguides or vice-versa to couple light into such waveguides.

BACKGROUND OF THE DISCLOSURE

The capability to couple light in and out of optical waveguides is a prerequisite for many applications areas of integrated optics, photonics, and optoelectronics, such as fiber-chip coupling and integrated optical phased arrays. Surface gratings are commonly used to perform light coupling in integrated photonics. Since grating operation requires a proper phase relation between the different periods to be satisfied (grating equation), the diffraction angle commonly depends strongly on the wavelength of light, especially in the high index contrast Silicon-On-Insulator (SOI) platform. Scattering efficiency also depends on wavelength. These dependencies impact the grating bandwidth, reducing the fiber-chip coupling efficiency when wavelength is detuned from the design point (which is problematic for example for Wavelength Division Multiplexing systems) and impacting the radiation pattern and angle accuracy of phased arrays.

Research in surface gratings has explored several approaches to extend their operational bandwidth, i.e. reduce the dependence of the diffraction angle and scattering efficiency on wavelength. One possible solution is attenuating the dispersion of the leaky Bloch mode by reducing the average refractive index of the grating. This has been achieved for example using silicon nitride (SiN) instead of a SOI platform. The same approach can also be pursued in a SOI platform by engineering the dispersion in the grating area through the integration of subwavelength metamaterials. Chirping the grating period can also be used to increase the bandwidth. Other approaches rely on reducing the effective interaction length of the grating. In the case of fiber-chip coupling, this requires using a fiber with smaller mode field diameter.

Such prior art approaches achieve only a limited increase of the bandwidth and suffer from a trade-off between bandwidth and overall efficiency. Decreasing the average effective index of the grating reduces the index contrast between the cladding materials and the grating, increasing light leakage into the cladding. Shorter gratings also suffer in terms of diffraction efficiency since in real-world applications it is usually difficult to obtain a large increase of the scattering strength in the grating region to compensate for the reduced interaction length.

Thus, it will be appreciated that the ability to reduce the dependence of the diffraction angle on the wavelength of light while maintaining a high diffraction efficiency of the antenna is a prerequisite for performing light emission from and to optical waveguides.

Any discussion of problems provided in this section has been included in this disclosure solely for the purposes of providing a background for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIGS. 3a and 3b show 2D FDTD simulation results for the antenna device depicted in FIG. 2.

FIG. 4 shows the simulated far field distribution for the antenna device depicted in FIG. 2.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth below, the trade-off between diffraction efficiency and bandwidth can be overcome by combining a short effective interaction length with other methods of grating engineering to increase the scattering strength, such as core thickness optimization, apodization, and directionality enhancement by proper scattering block design or back-reflectors.

In one embodiment, off-chip light coupling (either to redirect optical waves from an in-plane direction to an out-of-plane direction or vice versa) is achieved using an antenna device comprising an array of radiating elements whose thickness is larger than $\lambda/2$, the number of radiating elements being chosen such that the length of the array is smaller than $10\lambda$, where $\lambda$ is the wavelength of the light in the material chosen for the radiating elements. By reducing the number of radiating elements in the array the dependence of the off-chip emission angle on the wavelength of light can be greatly reduced. Another advantage is that by using thick radiating elements the antenna efficiency can be greatly enhanced to compensate for reduced efficiency as a consequence of the small number of radiating elements in the array.

Therefore, according to an aspect there is provided . . .

Figure 1:
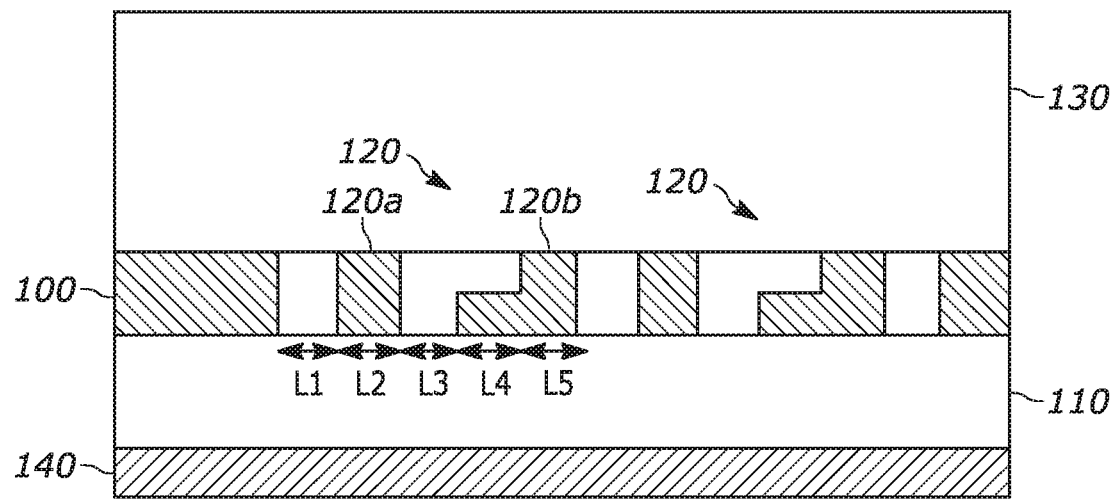
FIG. 1 is a schematic cross-section view of an antenna device according to a first embodiment.

Turning to FIG. 1, an embodiment of waveguide antenna device suitable for off-chip light coupling is shown, comprising an input waveguide 100, silicon substrate 140, a buried oxide layer (BOX), 110 an array of silicon radiating elements 120, and a silica upper cladding layer 130.

Each radiating element of the antenna consists of a pillar 120a of un-etched silicon, which in embodiments can be 300-nm-thick, and an L-shaped segment 120b, which in embodiments can be a partial etch of 150 nm. The L-shape segment 120b provides blazing to increase the fraction of power diffracted upwards and improve the grating directionality while the pillar 120a reduces back-reflection by destructive interference. The thick (e.g. 300 nm) silicon layer increases the grating scattering strength of the radiating elements 120 and hence reduces the required number of elements to achieve a target efficiency.

The antenna embodiment shown in FIG. 1 results in vertical emission (i.e., with the center axis of the emitted beam being approximately perpendicular to the chip plane) and a technique such as described in D. Melati et al., "Mapping the global design space of nanophotonic components using machine learning pattern recognition," Nature Commun, vol. 10, no. 1, pp. 1-9, 2019] for selecting the best values for each of the five segments L1-L5 of the radiating elements 120.

Simulations for the waveguide antenna device having five radiating elements 120 were performed using a 2D-FDTD simulator (for simplicity, FIG. 1 shows only two radiating elements). Light at a central wavelength of $\lambda=1550$ nm was launched into the antenna by the fundamental TE mode of the input waveguide 100 at one side of the antenna device. Silicon and silica refractive indices are 3.478 and 1.448 at $\lambda=1550$ nm, respectively, and dispersion was also taken into account. The silicon substrate 100 was included in the simulation even though its effect is normally negligible due to the high directionality of the grating originated from its vertical asymmetry. Optimal segment lengths were chosen as L=[112, 54, 188, 176, 171] nm, which resulted in a total length of 3.51 μm for the antenna comprising five radiating elements. This design provided high values for both the upward diffraction efficiency and directionality, being respectively $\rho u=0.876$ and $\Gamma=\rho u/(\rho u+\rho d)=0.947$, with $\rho d$ the fraction of the injected optical power diffracted downwards.

The antenna device of FIG. 1 can also be used to couple light into (or from) an optical fiber placed vertically on top of the antenna. In this case, the mode of the fiber can be modeled with a Gaussian function with a mode field diameter of 3.2 μm at $\lambda=1550$ nm. The fiber coupling efficiency, calculated as $\eta=\rho u \cdot \phi$ where $\phi$ is the overlap integral between the diffracted field and the Gaussian function, can be as high as $\eta=0.759$ (−1.20 dB). At the same time, the 1-dB bandwidth of $\eta$ can be about 133 nm and back-reflection (i.e., the fraction of power coupled to the counter-propagating fundamental TE mode of the input waveguide) can be lower than −20 dB.

In another embodiment, the requirement for a fully periodic structure for the antenna device of FIG. 1 can be relaxed, allowing one radiating element 120 to have different segment lengths than the remaining four elements (apodization). For example, using the design procedure described above segment lengths L=[57, 93, 118, 90, 277, 143, 41, 225, 156, 171] nm can be selected, where the first five numbers are the lengths of the segments for the first radiating element, and the remaining numbers are the lengths of the segments for the other four identical radiating elements (i.e. 57 nm is the length of the first gap, 93 nm is the length of the pillar, 118 nm is the length of the second gap, 90 nm is the length of the partially etched part, and 277 nm is the length of the last un-etched segment, etc). This design can achieve an upward diffraction efficiency $\rho u=0.919$, directionality $\Gamma=0.979$, fiber coupling efficiency $\eta=0.813$, back-reflections lower than −20 dB, and 1-dB bandwidth of 158 nm, further improving the performance of the periodic design.

The two antenna examples described above combine high upward diffraction efficiency, high fiber coupling efficiency, small back-reflection, large bandwidth, and a compact total length of only 3.51 μm and 3.58 μm, respectively.

Figure 2:
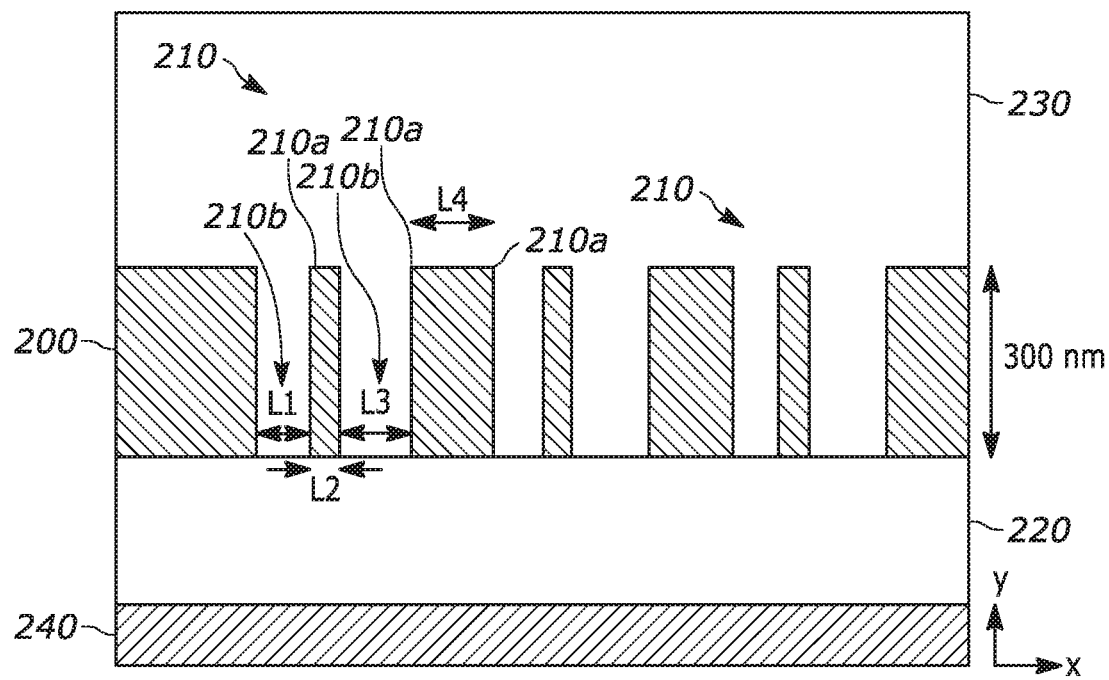
FIG. 2 is a schematic cross-section view of an antenna device according to a second embodiment.

Turning to FIG. 2, a second embodiment of the waveguide antenna device is shown comprising an input waveguide 200, a 300-nm-thick silicon waveguide core comprising a plurality of identical radiating elements 210, a 1-μm buried oxide layer (BOX) 220 and 2-μm silica cladding 230 and silicon substrate 240. Each of the radiating elements 210 comprises two sections of un-etched silicon segments 210a and two sections of fully etched gaps 210b. The use of two silicon segments reduces the back-reflection by destructive interference of the reflected mode (as for the first embodiment described above). The different sections of each radiating element have a length of $L_1$, $L_2$, $L_3$ and $L_4$ where $L_1$ and $L_3$ refer to the length of the fully etched regions, $L_2$ and $L_4$ the length of the un-etched silicon segments.

In a design example for the embodiment of FIG. 2, an antenna device having three radiating elements was simulated using 2D-FDTD at wavelength $\lambda=1550$ nm, with parameters L1=116 nm, L2=50 nm, L3=185 nm, L4=399 nm, and a total length of the antenna of 2.25 μm. FIG. 3a shows a diffraction efficiency of 56% achieved at the central wavelength of 1.55 μm. FIG. 3b shows the simulated back-reflection including both the total reflected power and the fraction of power coupled to the counter-propagating fundamental TE mode of the input waveguide (modal reflection). The total back-reflection is seen to be below −20 dB and the modal reflectivity is approximately −21 dB at the central wavelength of 1.55 μm. Additionally, the simulated downward diffracted power and the residual power in the waveguide at the end of the antenna are seen to be 25% and 19%, respectively. The far field intensity as a function of polar angle $\theta$ is shown in FIG. 4. The diffraction angle is 9° from the vertical. The full width half maximum (FWHM) of far field intensity along the polar coordinate is 23° at 1.55 μm.

Figure 5:
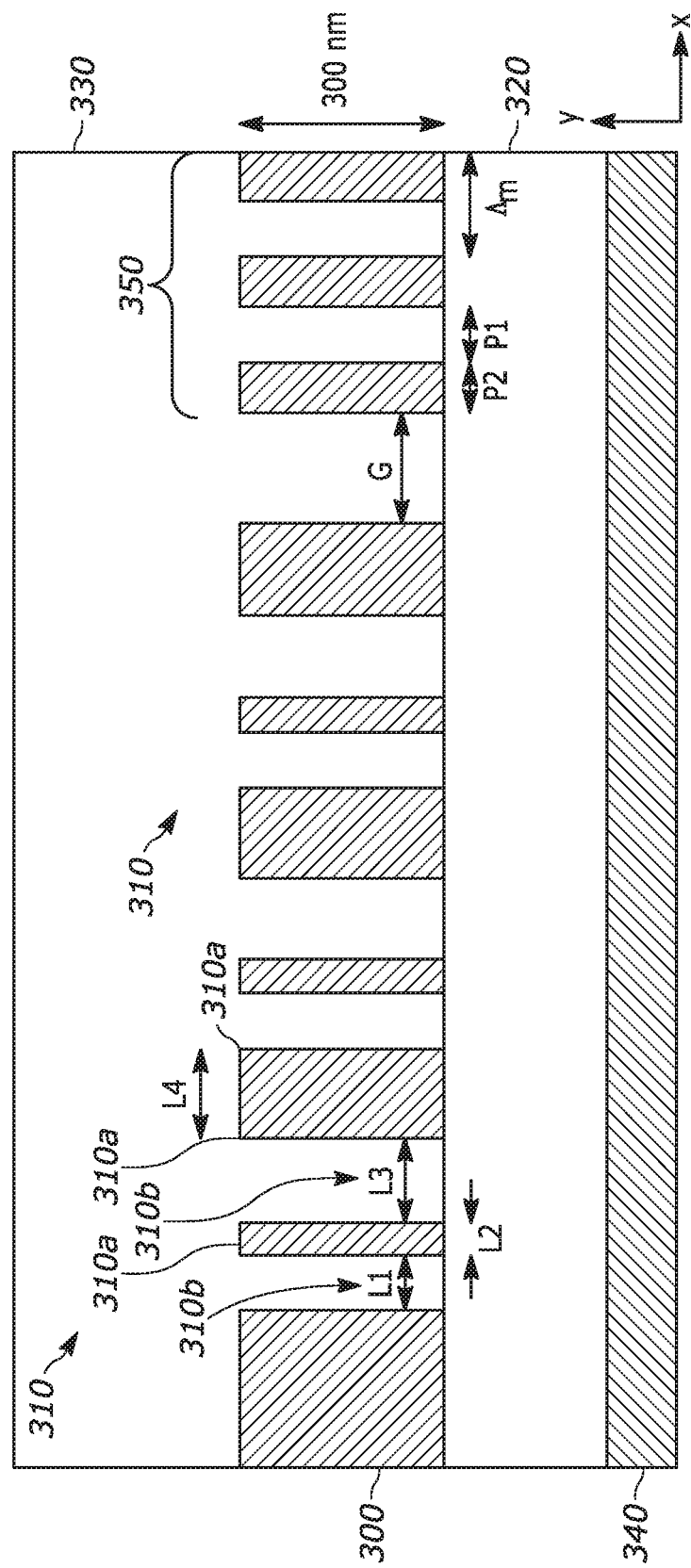
FIG. 5 is a schematic cross-section view of the antenna device shown in FIG. 2 with an additional Bragg reflector at one end.

Turning to FIG. 5, a third embodiment of the waveguide antenna device is shown comprising an input waveguide 300, a 300-nm-thick silicon waveguide core comprising a plurality of identical radiating elements 310, a 1-μm buried oxide layer (BOX) 320 and 2-μm silica cladding 530 and silicon substrate 340. Each of the radiating elements 310 comprises two sections of un-etched silicon segments 310a and two sections of fully etched gaps 310b. In this embodiment, a Bragg reflector (BR) 350 is placed at the end of the antenna device. The BR 350 behaves as a mirror for recirculating within the antenna the fraction of the optical power that remains un-diffracted, hence increasing the total upward diffraction efficiency. The G parameter represents the separation distance between the antenna termination and the BR 350.

The Bragg reflector 350 in the embodiment of FIG. 5 has three periods, with each period comprising a fully etched gap of length $P_1$ and un-etched silicon region of length $P_2$. These parameters define the period ($\Lambda_m = P_1 + P_2$) of the Bragg reflector 350, which must satisfy the Bragg condition at the first order of diffraction, $\Lambda_m = \lambda/2n_{eff}$, where $\lambda$ is the central wavelength 1.55 μm and $n_{eff}$ is the effective refractive index of the Bloch mode of the grating. The optimized values for the structural parameters of Bragg reflector 350 are $P_1$=152 nm and $P_2$=148 nm. A reflectivity of 95% was achieved for the Bragg reflector 350 at 1.55 μm wavelength and a reflectivity above 94% for wavelengths ranging from 1.5 μm to 1.6 μm. The structural parameter values for the antenna part of the device are the same as the design example of FIG. 2 (i.e. $L_1$=116 nm, $L_2$=50 nm, $L_3$=185 nm, $L_4$=399 nm) while G=337 nm. The total structure length (x-direction) was 3.487 μm.

Figure 6:
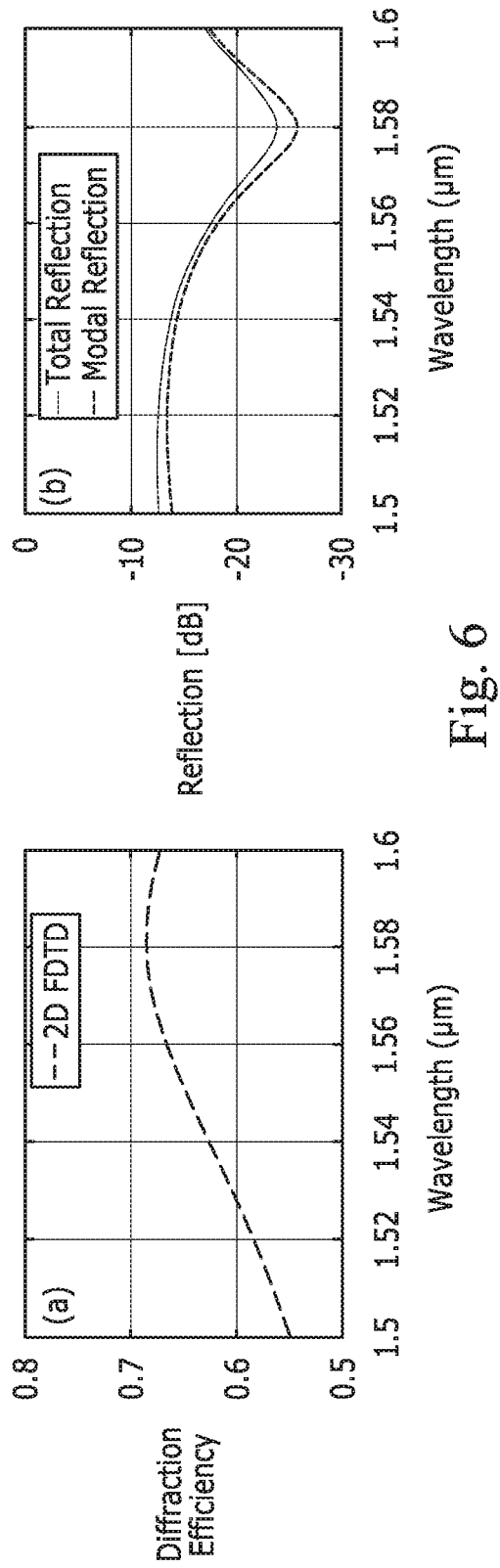
FIGS. 6a and 6b show 2D FDTD simulation results for the antenna device depicted in FIG. 5.
Figure 7:
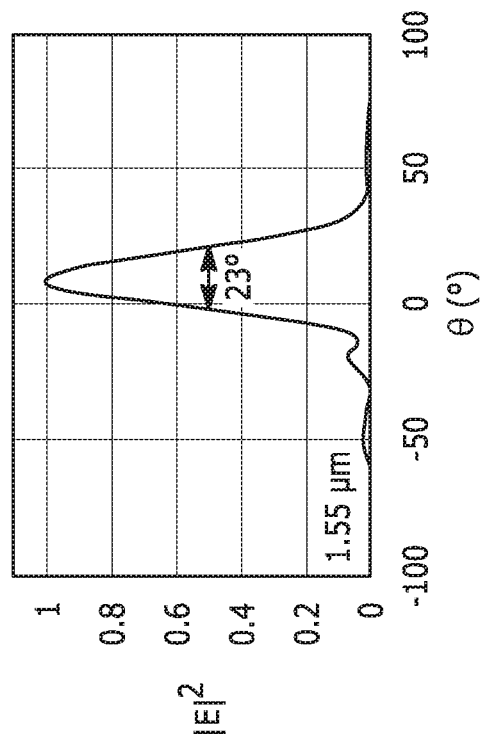
FIG. 7 shows the simulated far field distribution for the antenna device depicted in FIG. 5.

With reference to the embodiment of FIG. 5, FIG. 6a shows the diffraction efficiency for wavelengths ranging from 1.5 μm to 1.6 μm, with a diffraction efficiency of 64% at the central wavelength of 1.55 μm, indicating an improvement of 8% compared to the design example if FIG. 5 without the Bragg reflector 350. FIG. 6b shows a modal back-reflection below −16 dB over the C optical communication band. The downward diffracted power and the residual power in the waveguide at the end of the Bragg reflector are about 30% and 0.5%, respectively. The far field intensity as a function of polar angle θ is shown in FIG. 7, from which it will be noted that the diffraction angle is 8° from vertical. The full width half maximum (FWHM) of far field intensity along the polar coordinate is seen to be 23° at 1.55 μm.

Figure 8:
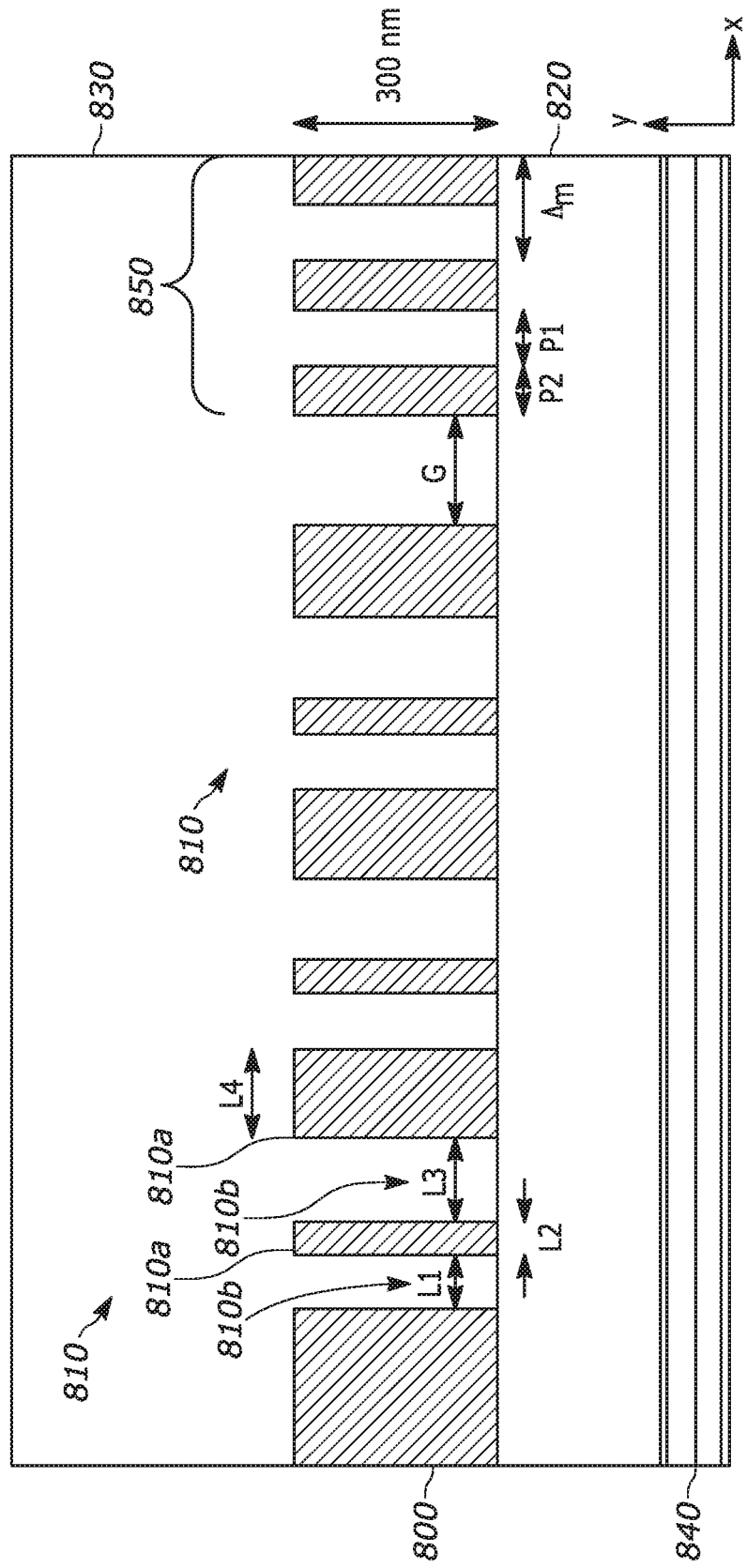
FIG. 8 is a schematic cross-section view of the antenna device shown in FIG. 5 with an additional reflector underneath the antenna.

Turning to FIG. 8, a fourth embodiment of the waveguide antenna device is shown comprising an input waveguide 800, a 300-nm-thick silicon waveguide core comprising a plurality of identical radiating elements 810, and a 1-μm buried oxide layer (BOX) 820 and 2-μm silica cladding 830. Each of the radiating elements 810 comprises two sections of un-etched silicon segments 810a and two sections of fully etched gaps 810b. Like the embodiment of FIG. 5, a Bragg reflector 850 is placed at the end of the antenna device. In the embodiment of FIG. 8, a bottom reflector 860 replaces the Si substrate to upwardly reflect the fraction of optical power diffracted downward by the antenna (e.g. 30%). This further increases the upward diffracted efficiency by having the reflected light constructively interfere with upward diffracted light. The parameters of the antenna embodiment of FIG. 8 are L1=97 nm, L2=50 nm, L3=181 nm, L4=389 nm. For Bragg reflector 850, the structural parameters are the same as the embodiment of FIG. 5 (P1=152 nm, P2=148 nm.), and the total structure length (x-direction) was 3.384 μm.

Figure 9:
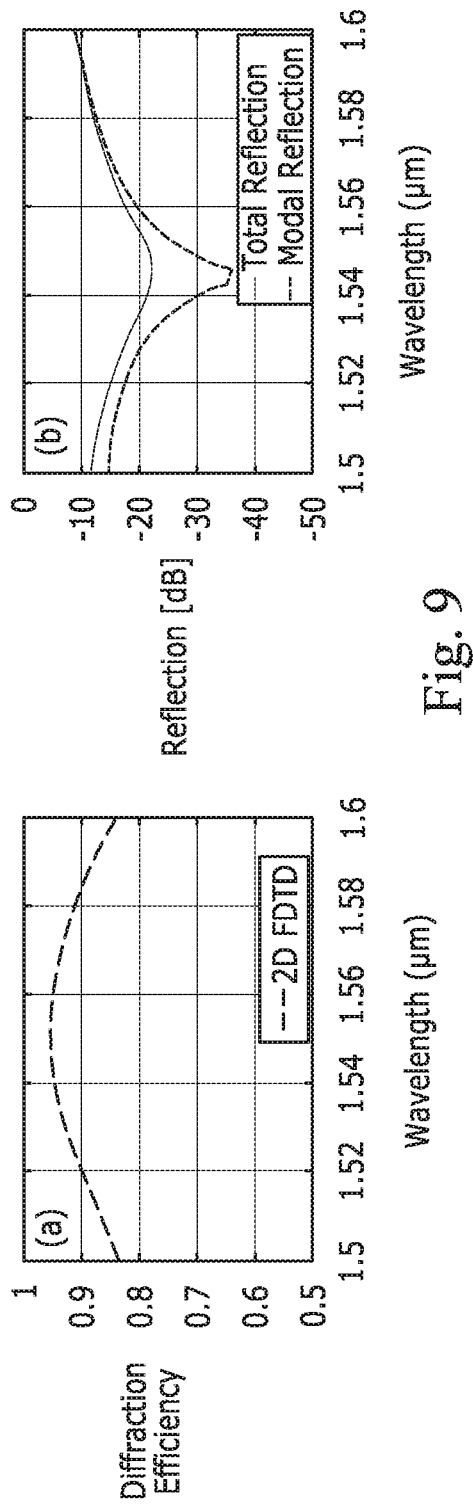
FIGS. 9a and 9b show 2D FDTD simulation results for the antenna device depicted in FIG. 8.
Figure 10:
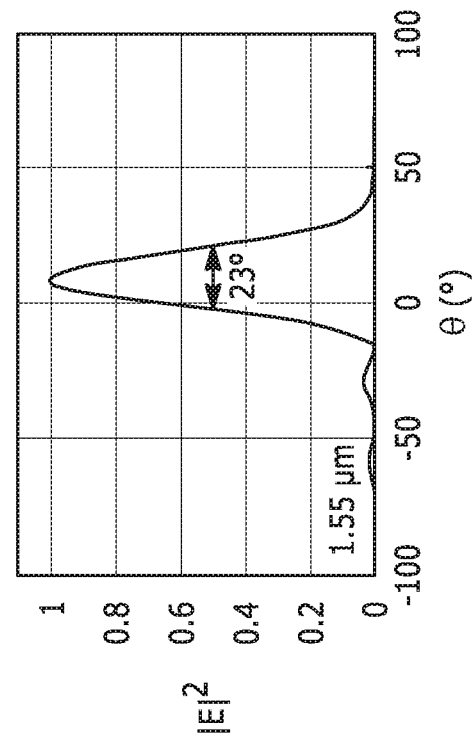
FIG. 10 shows the simulated far field distribution for the antenna device depicted in FIG. 8.

With reference to the embodiment of FIG. 8, FIG. 9a shows a diffraction efficiency of 95% at the central wavelength of 1.55 urn. FIG. 9b shows total back-reflection power below −21 dB and modal reflectivity of −27 dB at the central wavelength of 1.55 urn. The far field intensity as a function of polar angle θ is shown in FIG. 10. The diffraction angle is 4° from the vertical. The full width half maximum (FWHM) of the far field intensity along the polar coordinate is 23° at 1.55 μm.

Figure 11:
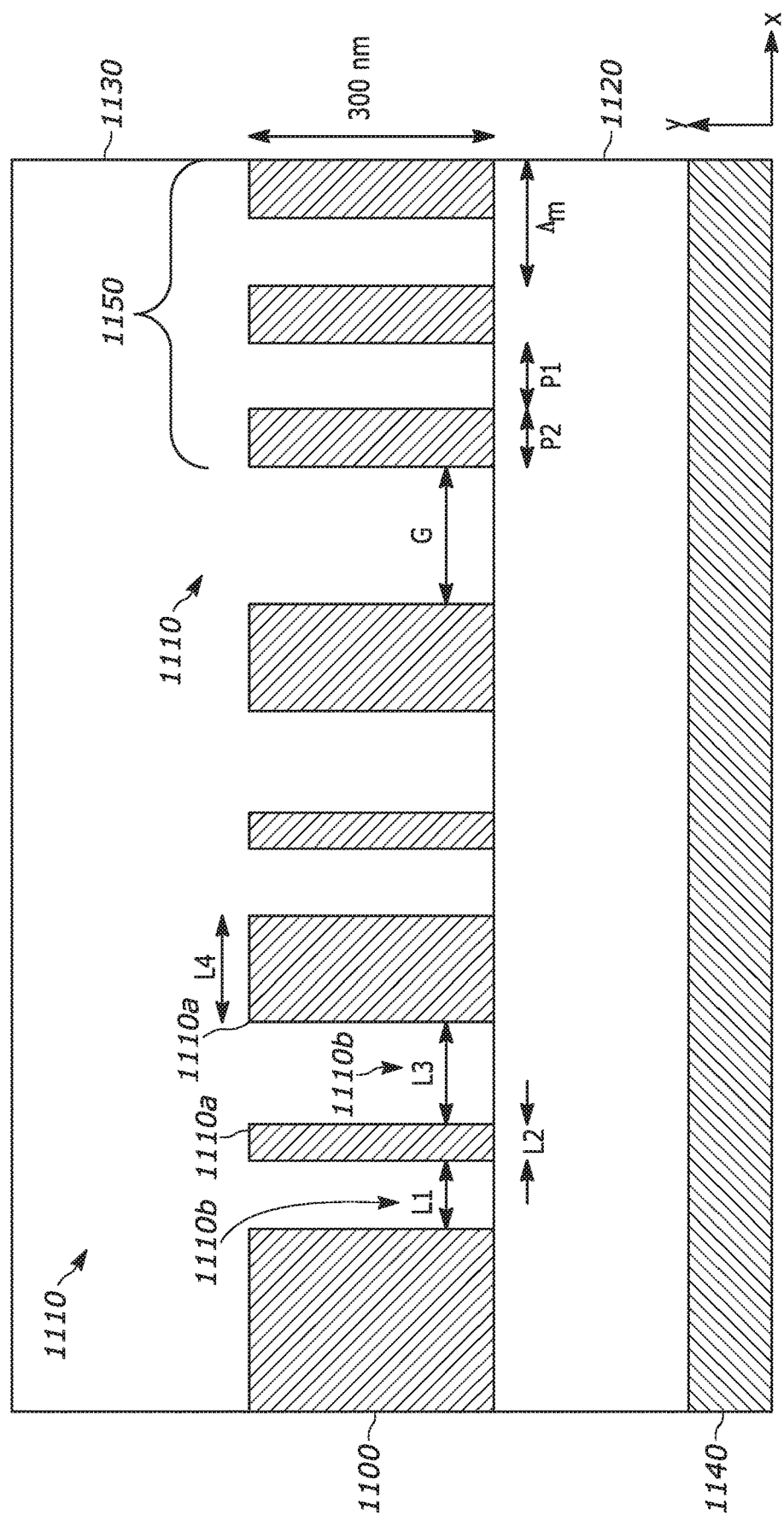
FIG. 11 is a schematic cross-section view of the antenna device shown in FIG. 5 with two radiating elements instead of three.

Turning to FIG. 11, a fifth embodiment of the waveguide antenna device is shown comprising an input waveguide 1100, a 300-nm-thick silicon waveguide core comprising a plurality of identical radiating elements 1110, a 1-μm buried oxide layer (BOX) 1120, 2-μm silica cladding 1130 and silicon substrate 1140. Each of the radiating elements 1110 comprises two sections of un-etched silicon segments 1110a and two sections of fully etched gaps 1110b. As in the embodiment of FIG. 5, a Bragg reflector 1150 is placed at the end of the antenna device. In the embodiment of FIG. 11, only two radiating elements 1110 are provided, exploiting the fact the Bragg reflector 1150 at the end of the antenna allows the number of radiating elements to be reduced because the un-diffracted power is recirculated by the Bragg reflector 1150 in the antenna device. In other respects, the parameters are the same as the antenna device embodiments of FIG. 5 having three radiating elements 1110 and Bragg reflector 1150. The total structure length (x-direction) is 2.737 μm.

Figure 12:
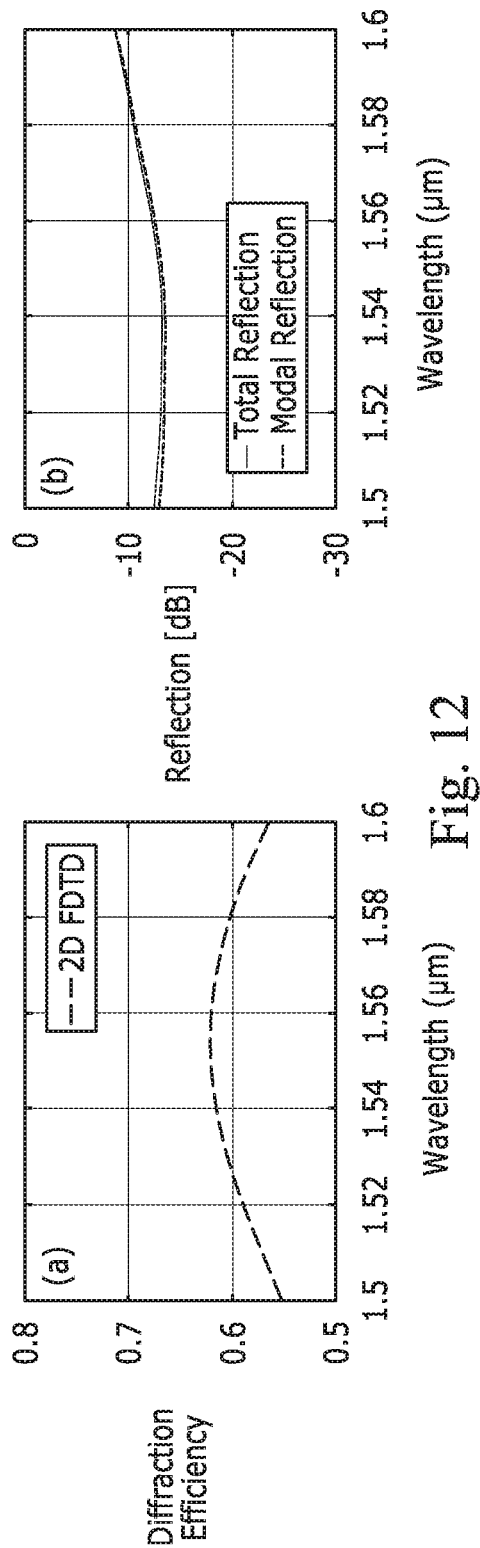
FIGS. 12a and 12b show 2D FDTD simulation results for the antenna device depicted in FIG. 11.
Figure 13:
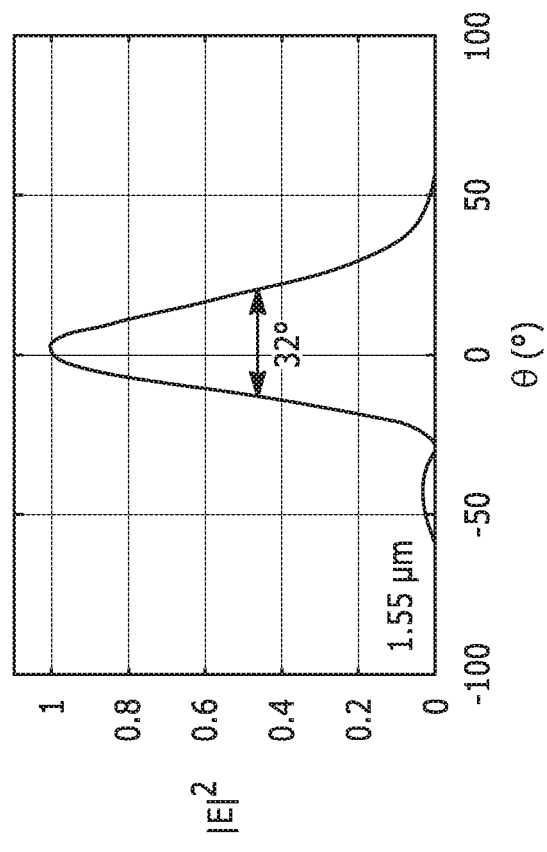
FIG. 13 shows the simulated far field distribution for the antenna device depicted in FIG. 11.

With reference to the embodiment of FIG. 11, FIG. 12a shows a diffraction efficiency of 62% at the central wavelength of 1.55 μm, representing only a 2% reduction compared to the antenna with three radiating elements despite a reduction in the length of the full device of more than 1 μm. FIG. 12b shows total back-reflection power below −12.7 dB and modal reflectivity of −13 dB at the central wavelength of 1.55 μm. The downward diffracted power and the residual power in the waveguide at the end of the Bragg reflector 350 are about 28% and 0.8%, respectively. The far field intensity as a function of polar angle θ is shown in FIG. 13. The diffraction angle is 2° from the vertical. The full width half maximum (FWHM) of far field intensity along the polar coordinate is 32° at 1.55 μm, representing an increment of 9° compared to an antenna device with three radiating elements.

Figure 14:
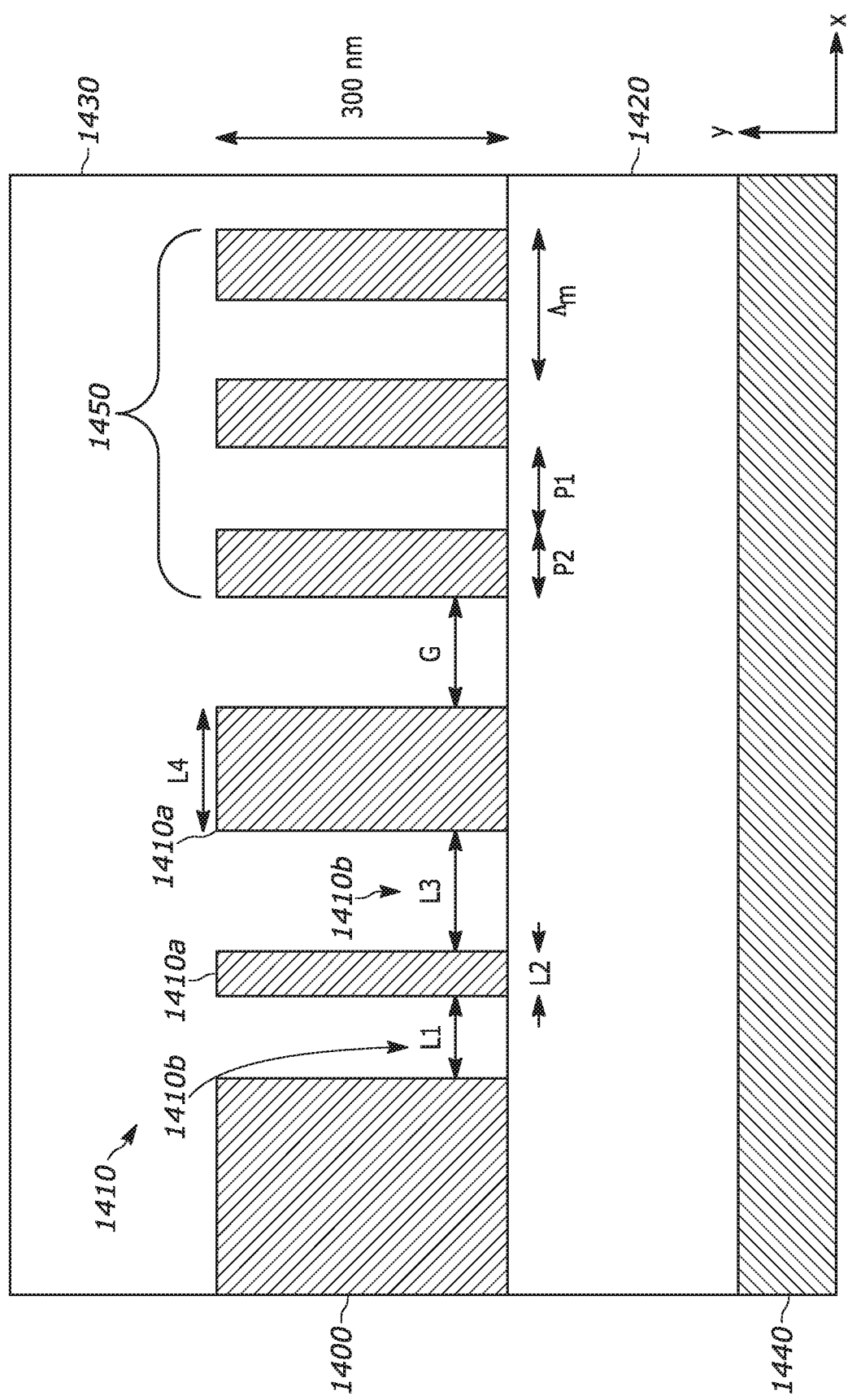
FIG. 14 is a schematic cross-section view of the antenna device shown in FIG. 5 with one radiating element instead of three.

Turning to FIG. 14, a sixth embodiment of the waveguide antenna device is shown comprising an input waveguide 1400, a 300-nm-thick silicon waveguide core comprising a radiating element 1410, a 1-μm buried oxide layer (BOX) 1420, 2-μm silica cladding 1430 and silicon substrate 1440. The radiating element 1410 comprises two sections of un-etched silicon segments 1410a and two sections of fully etched gaps 1410b. As in the embodiment of FIG. 5, a Bragg reflector 1450 is placed at the end of the antenna device. In the embodiment of FIG. 14, only a single radiating element 1410 is provided, exploiting the fact the Bragg reflector 1450 at the end of the antenna allows the number of radiating elements to be reduced because the un-diffracted power is recirculated by the Bragg reflector 1450 in the antenna device. In other respects, the parameters are the same as the antenna device embodiment of FIGS. 5 and 11, while the total structure length (x-direction) is 1.987 μm.

Figure 15:
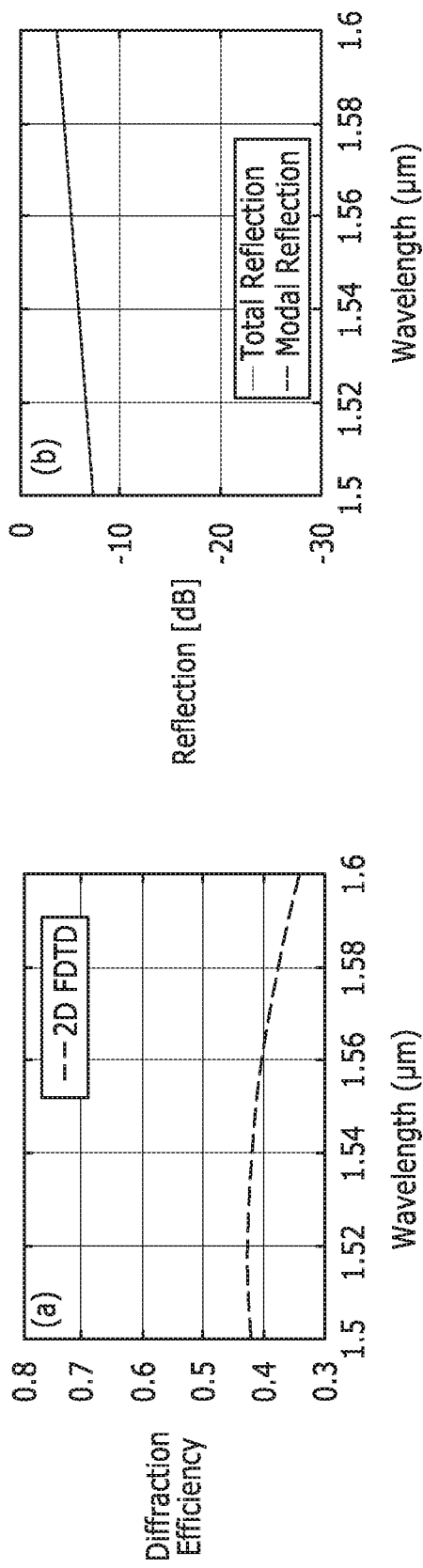
FIGS. 15a and 15b show 2D FDTD simulation results for the antenna device depicted in FIG. 14.
Figure 16:
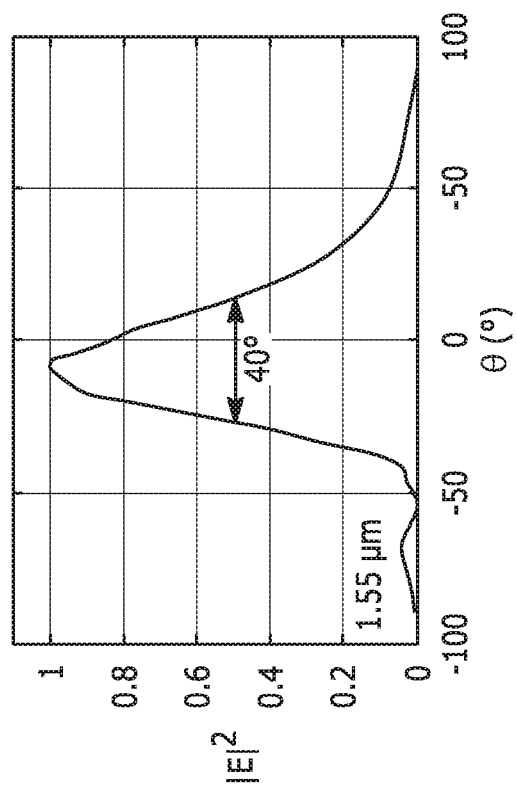
FIG. 16 shows the simulated far field distribution for the antenna device depicted in FIG. 14.

With reference to the embodiment of FIG. 14, FIG. 15a shows a diffraction efficiency of 41% at the central wavelength of 1.55 μm. FIG. 15b shows total back-reflection power below −6 dB and modal reflectivity of −6 dB at the central wavelength of 1.55 μm. The downward diffracted power and the residual power in the waveguide at the end of the Bragg reflector 350 are about 20% and 1%, respectively. The diffraction angle is −8° from the vertical (FIG. 16). The full width half maximum (FWHM) of the far field intensity along the polar coordinate is 40° at 1.55 μm.

Contemplated applications of embodiments set forth herein include optical communication systems such as waveguide-to-fiber and chip-to-chip interfaces for telecommunications, data communications, optical interconnects, WDM systems, dense fiber arrays, multi-channel systems and multi-core fiber interfaces. Additional examples of applications include optical (phased) arrays, single-pixel imaging, Lidars for remote sensing and navigation, autonomous cars and drones navigation, free-space optical communication, and power efficient transceivers.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

The invention claimed is:

1. An antenna device for performing off-chip light coupling in and out of optical waveguides, comprising an array of radiating elements arranged in a plane, each radiating element having a pair of un etched core segments and etched gaps, spaced apart according to a pitch for diffracting light off said plane; wherein the number of radiating elements is chosen such that the length of the array is less than $10\lambda$, where $\Delta$ is the wavelength of light in the core material segments.

2. The antenna device of claim 1, wherein the thickness of said radiating elements is greater than $\lambda/2$.

3. The antenna device of claim 1, wherein at least one of the segments in the radiating elements is L-shaped.

4. The antenna device of claim 1, wherein said array of radiating elements is configured to form an antenna for coupling a waveguide mode with a free space propagating beam or an optical fiber mode.

5. The antenna device of claim 4, wherein said radiating elements comprise a subwavelength grating configured to modify the propagation mode of the light, and said subwavelength grating having a pitch sufficiently less than the wavelength of the light to optically diffract light off said plane.

6. The antenna device of claim 4, wherein at least one of the segments in the radiating element is L-shaped.

7. The antenna device of claim 4, further including a reflector placed at an end of said array of radiating elements.

8. The antenna device of claim 4, further including a reflector placed underneath said array of radiating elements.

9. The antenna device of claim 7, wherein the reflector is a Bragg reflector.

10. The antenna device of claim 1, further including an input waveguide for directing light to the array of radiating elements.

11. The antenna device of claim 1, further including a buried oxide layer beneath the array of radiating element.

12. An antenna device for performing off-chip light coupling in and out of optical waveguides, comprising at least one radiating element arranged in a plane, having a pair of un-etched core segments and etched gaps, spaced apart according to a pitch for diffracting light off said plane; wherein the number of radiating elements is chosen such that the length of the antenna device is less than $10\lambda$, where $\Delta$ is the wavelength of light in the core segments.

13. The antenna device of claim 12, wherein the thickness of said at least one radiating element is greater than $\lambda/2$.

14. The antenna device of claim 12, wherein at least one of the segments is L-shaped.

15. The antenna device of claim 12, wherein a reflector is placed at the end of the antenna device.

16. The antenna device of claim 12, wherein a reflector is placed underneath the antenna device.

17. The antenna device of claim 16, wherein the reflector is a Bragg reflector.

18. The antenna device of claim 12, further including an input waveguide for directing light to the antenna.

19. The antenna device of claim 1, wherein the core material in silicon.

* * * * *